(12) United States Patent
Troeltzsch et al.

(10) Patent No.: US 10,404,403 B2
(45) Date of Patent: Sep. 3, 2019

(54) SYSTEMS AND METHODS FOR MULTIPLEXING AND DEMODULATION AT HIGH FREQUENCIES AND INCREASED COMMUNICATION BANDWIDTH

(71) Applicant: Ball Aerospace & Technologies Corp., Boulder, CO (US)

(72) Inventors: John R. Troeltzsch, Boulder, CO (US); Colin H. Wilson, Superior, CO (US); Robert M. Pierce, Longmont, CO (US); Holden Chase, Boulder, CO (US); Brian Primeau, Boulder, CO (US); Robert Kaliski, Boulder, CO (US); Bevan D. Staple, Longmont, CO (US); Robert Marshalek, Superior, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 1 day.

(21) Appl. No.: 15/921,478

(22) Filed: Mar. 14, 2018

(65) Prior Publication Data

US 2018/0270010 A1  Sep. 20, 2018

Related U.S. Application Data

(60) Provisional application No. 62/471,250, filed on Mar. 14, 2017.

(51) Int. Cl.
*H04J 14/00* (2006.01)
*H04J 14/02* (2006.01)
(Continued)

(52) U.S. Cl.
CPC ............ *H04J 14/06* (2013.01); *H04B 10/118* (2013.01); *H04B 10/1129* (2013.01);
(Continued)

(58) Field of Classification Search
CPC ...... H04J 14/06; H04J 14/007; H04J 14/0213; H04J 14/0208; H04J 14/02; H04B 10/1129; H04B 10/118
See application file for complete search history.

(56) References Cited

U.S. PATENT DOCUMENTS 6,115,162 A   9/2000  Graves et al.
6,678,476 B1  1/2004  Hou
(Continued)

FOREIGN PATENT DOCUMENTS

WO   WO-2017029808 A1 *  2/2017  ........... H04B 10/112

OTHER PUBLICATIONS

International Search Report and Written Opinion for International (PCT) Patent Application No. PCT/US18/22298, dated Jun. 1, 2018 11 pages.
(Continued)

*Primary Examiner* — Leslie C Pascal
(74) *Attorney, Agent, or Firm* — Sheridan Ross P.C.

(57) ABSTRACT

Free-space communication systems and methods are provided. The systems include a transmitter that combines multiple sets of radio-frequency-modulated optical carrier frequencies for transmission across free space using multiple transmission apertures. Different sets of signals are filtered to form single sideband signals. The different sets of single sideband signals are then combined to form dense wavelength division multiplexed signals. In addition, combined sets of signals of different polarizations can be combined. A receiver can include a single receive aperture.

17 Claims, 12 Drawing Sheets

(51) Int. Cl.
  *H04J 14/06* (2006.01)
  *H04B 10/112* (2013.01)
  *H04B 10/118* (2013.01)

(52) U.S. Cl.
  CPC ............ *H04J 14/007* (2013.01); *H04J 14/02* (2013.01); *H04J 14/0208* (2013.01); *H04J 14/0213* (2013.01)

(56) References Cited

U.S. PATENT DOCUMENTS

| | | | |
|---|---|---|---|
| 7,123,835 B2 * | 10/2006 | Agarwal | H04B 10/506 398/43 |
| 7,277,641 B1 | 10/2007 | Gleckman | |
| 8,306,273 B1 | 11/2012 | Gravseth | |
| 8,744,126 B1 | 6/2014 | Rohrschneider | |
| 9,438,341 B2 | 9/2016 | Brumley, II et al. | |
| 2002/0067883 A1 | 6/2002 | Lo | |
| 2004/0156581 A1 | 8/2004 | Golub et al. | |
| 2005/0013615 A1 * | 1/2005 | Matsuda | H04J 14/0208 398/83 |
| 2005/0041975 A1 * | 2/2005 | Nakamura | H04J 14/02 398/85 |
| 2009/0067843 A1 | 3/2009 | Way et al. | |
| 2012/0008961 A1 | 1/2012 | Chen et al. | |
| 2012/0213519 A1 | 8/2012 | Lee et al. | |
| 2013/0077973 A1 * | 3/2013 | Xie | H04B 10/508 398/65 |
| 2015/0010307 A1 * | 1/2015 | Zhong | H04B 10/025754 398/68 |
| 2015/0093117 A1 | 4/2015 | Rahn | |

OTHER PUBLICATIONS

Tanimura et al. "Deep Learning Based OSNR Monitoring Independent of Modulation Format, Symbol Rate and Chromatic Dispersion," VDE Verlag GMBH, Berlin, 42nd European Conference and Exhibition on Optical Communications, ECOC2016, Sep. 18-22, 2016, pp. 280-282.

* cited by examiner

SYSTEMS AND METHODS FOR MULTIPLEXING AND DEMODULATION AT HIGH FREQUENCIES AND INCREASED COMMUNICATION BANDWIDTH

CROSS-REFERENCE TO RELATED APPLICATIONS

This application claims the benefit of U.S. Provisional Patent Application Ser. No. 62/471,250, filed Mar. 14, 2017, the entire disclosure of which is hereby incorporated herein by reference.

FIELD

Systems and methods for multiplexing and transmitting high frequency communication signals across free space and for demultiplexing high frequency communication signals are provided.

BACKGROUND

As the demand for more data channels increases for satellite communication, there exists a need to move to the optical spectrum as opposed to the traditional radio frequency spectrum. One method of increasing data channels in the optical domain for satellite communications is to use a dense wavelength division multiplexing (DWDM) scheme. However, as the radio frequency (RF) carrier and modulation frequencies increase to provide a greater bandwidth in wavelength grid communication systems, such as DWDM architectures with 25 GHz spacing, the maximum number of carriers can be limited by the dual modulation sidebands fitting within the wavelength spacing grid. In addition, the required spacing between adjacent wavelengths is relatively small. As the spacing between adjacent optical wavelengths decreases, the separation of different signals from one another becomes more difficult. To address this, current International Telecommunications Union (ITU) recommendations suggest a 100 GHz spacing between adjacent carrier wavelengths. As an additional challenge, it is difficult to achieve a desired power density using a single mode fiber with all the DWDM channels. In particular, intensity related nonlinear effects can cause issues such as four-wave mixing, self and cross-phase modulation, chromatic dispersion, and the like, and can decrease the signal-to-noise ratio (SNR) of the signals. Moreover, at desired power levels, DWDM after amplification presents a significant challenge. Also, simply modulating an optical carrier frequency with a radio frequency information signal can require revisions to receiving equipment that increases costs.

SUMMARY

In accordance with embodiments of the present disclosure, a communication system is provided that utilizes a unique combination of RF multiplexing of wavelengths, single side-band suppression, polarization multiplexing, spatial multiplexing, and wavelength multiplexing in various combinations to optimize and enhance the transmission of DWDM signals in a free-space communication system with high frequency modulation. Furthermore, this system is new and different from the current alternative, where DWDM signals are transmitted in an optical fiber, by providing an efficient method of DWDM transmission in free-space. At least some embodiments of the present disclosure can utilize multiple sub-apertures, minimizing transmission challenges such as atmospheric degradation.

The present disclosure provides systems and methods for creating high density, multiplexed communication streams. The systems and method can include a plurality of individual communication channels formed by modulating an optical wavelength with a radio frequency carrier and a radio frequency information signal. The individual communication channels can be multiplexed using a unique combination of wavelength division multiplexing, single side-band suppression, interleaving, polarization multiplexing, and spatial multiplexing. The systems and methods disclosed herein allow for the multiplexing of a relatively large number of closely spaced communication channels into a high bandwidth communication stream that is transmitted across free space. In addition, systems and methods that allow for densely packed communication streams created using systems and methods as disclosed herein to be demultiplexed are provided.

In accordance with embodiments of the present disclosure, a communication node that is capable of transmitting densely packed communication streams across free space is provided. A communication node as disclosed herein can also receive densely packed communication streams that have been transmitted across free space. A communication node in accordance with embodiments of the present disclosure can be based on the ground, in space, or on some other type of mobile platform. In addition, different communication nodes can have different configurations and capabilities, based on the position and function of the communication node within a communication system.

The disclosed systems and methods for creating a communication stream generally include a plurality of light sources that each output light at a different wavelength. Each wavelength of light can be separately modulated with a radio frequency (RF) carrier signal and information signal. The resulting waveform is then passed through a filter to remove one of the two information signals (i.e. one of the sidebands) formed as a result of the modulation of the optical wavelength, thereby forming a communication channel. Next, a group of communication channels having a selected spacing between neighboring communication channels is formed using wavelength division multiplexing. An interleaver then interleaves multiple (e.g. two) groups of communication channels.

In accordance with at least some embodiments of the present disclosure, the carrier frequencies or channels passed through any one interleaver may include light of the same polarization. Thus, a first interleaved group of channels having a first polarization can be polarization multiplexed with a second group of interleaved signals having a second polarization using a polarization combiner.

Interleaved and polarization multiplexed groups of channels can then be passed to beam control optics, which deliver the combined communication channels to a telescope for transmission across free space to a receiving communication node. In accordance with the least some embodiments of the present disclosure, different polarization multiplexed groups of channels can be spatially multiplexed by providing the different groups to different transmission apertures that deliver the light comprising the groups of interleaved signals to different areas of the telescope aperture for transmission.

A communication node in accordance with embodiments of the present disclosure capable of receiving a communication stream containing a plurality of densely multiplexed communication channels can include a telescope upon which the communication stream is incident. The light gathered by the telescope is passed to beam control optics, which in turn pass the communication stream to receiver optics. Where the communication system receiving the communication stream is also capable of transmitting a communication stream, the telescope and the beam control optics can be used simultaneously for communication stream transmission and reception operations, particularly with respect to another communication node. Moreover, in a communication node capable of both transmission and reception, a dichroic element can be used to pass received communication signals to the receiver optics and demodulation components.

In accordance with embodiments of the present disclosure, a transmission architecture that features multiple sub-apertures, each associated with a subassembly that generates a subgroup of modulated optical frequencies, is provided. The spacing between carrier frequencies within any one subgroup is relatively large. Each subgroup is interleaved with at least one other subgroup, and provided to a telescope as sub-apertures via free space beam control optics. More particularly, beam combining and steering optics can provide the multiple subgroups to a single telescope for transmission to, for example, a space-based receiver. In accordance with at least some embodiments of the present disclosure, adjacent sets of subgroups, in addition to being differentiated by carrier frequency, have different polarizations from neighboring subgroups. In accordance with further embodiments of the present disclosure, a ground-based transceiver can implement a transmitter that includes multiple sub-apertures, while a space-based transceiver can include a receiver having a single aperture.

Additional features and advantages of embodiments of the disclosed systems and methods will become more readily apparent from the following description, particularly when taken together with the accompanying drawings.

DETAILED DESCRIPTION

Figure 1:
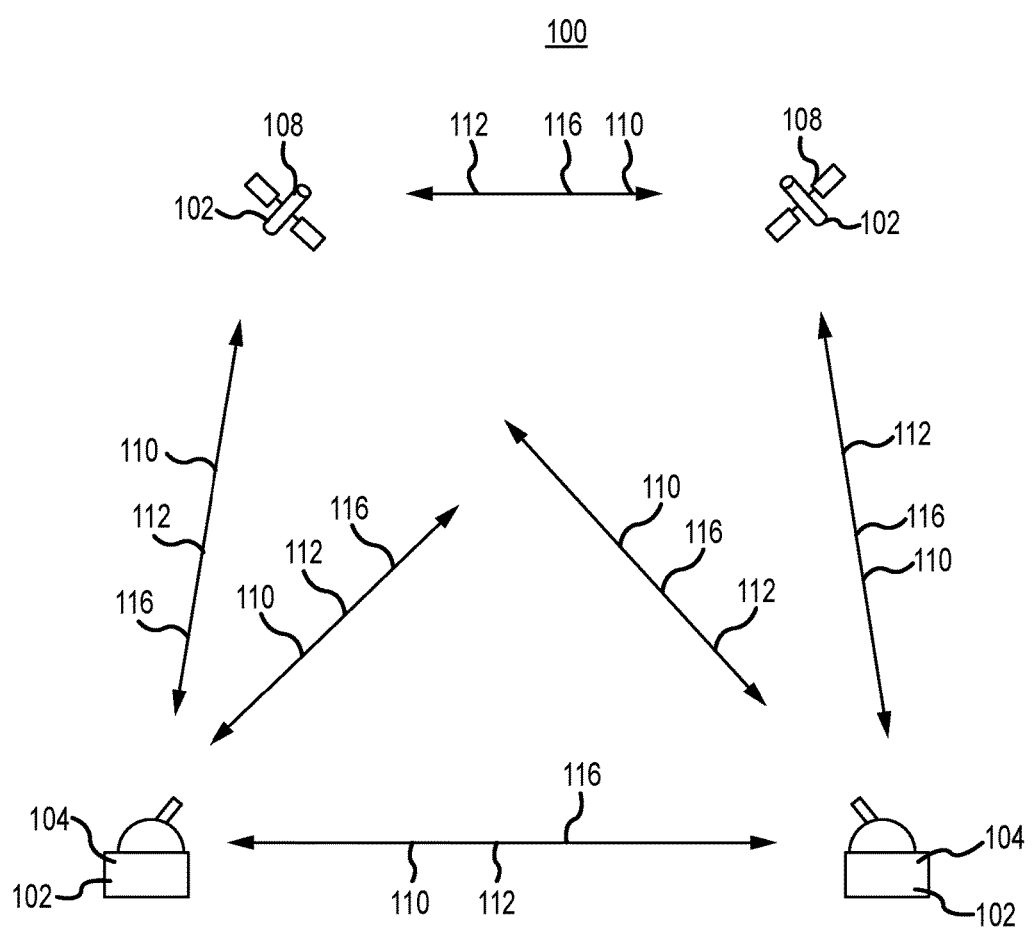
FIG. 1 is a depiction of a free-space optical communication system in accordance with embodiments of the present disclosure.

FIG. 1 depicts a free-space optical communication system 100 in accordance with embodiments of the present disclosure. The communication system 100 generally includes a plurality of communication nodes 102. For example, the communication system 100 can include a first or ground-based communication node 104 having a single aperture that is capable of transmitting a large number of data or communication signals or channels across free space using a common optical path to a second or space-based communication node 108. As used herein, free-space can include the atmosphere, outer space, or both the atmosphere and outer space, for example where transmissions are sent between a ground-based communication node 104 and a space-based communication node 108. In at least some embodiments, the space-based communication node 108 utilizes a single aperture for receiving signals from and for transmitting signals to a ground-based communication node 104. In addition, pairs of communication nodes 102 can transmit and receive communication signals over a common communication path 110, each using a single aperture.

The communication system 100 can incorporate any number of communication nodes 102, including any number of ground-based communication nodes 104 and any number of space-based communication nodes 108. Communication signals 112 transmitted from a ground-based communication node 104 to a space-based communication node 108 can include a relatively large number of optical carrier frequencies modulated by RF signals. Moreover, different sets or subgroups of optical frequencies can be transmitted from different sub-apertures included in the ground-based communication node 104. Communication signals 116 transmitted from a space-based communication node 108 to a ground-based communication node 104 can likewise include a number of optical carrier frequencies modulated by RF signals. Moreover, communication signals can be passed between ground-based communication nodes 104 and space-based communication nodes 108. In accordance with still other embodiments, a communication system 100 can include nodes or communication nodes 102 that are other than ground-based or space-based, including but not limited to communication nodes 102 mounted to platforms comprising ships, airplanes, aerostats, etc.

Figure 2:
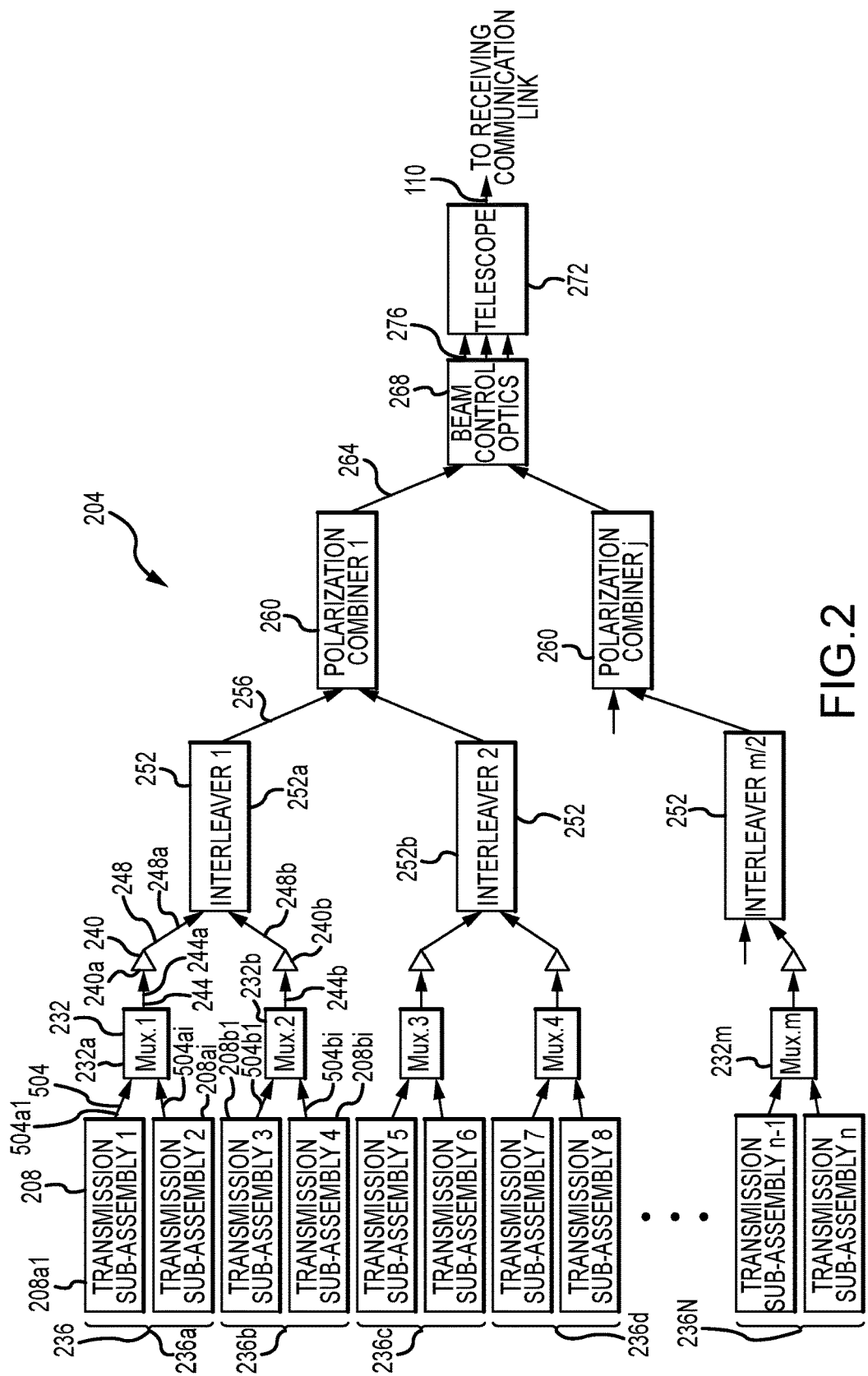
FIG. 2 is a block diagram depicting transmission components of a communication system in accordance with embodiments of the present disclosure.
Figure 3:
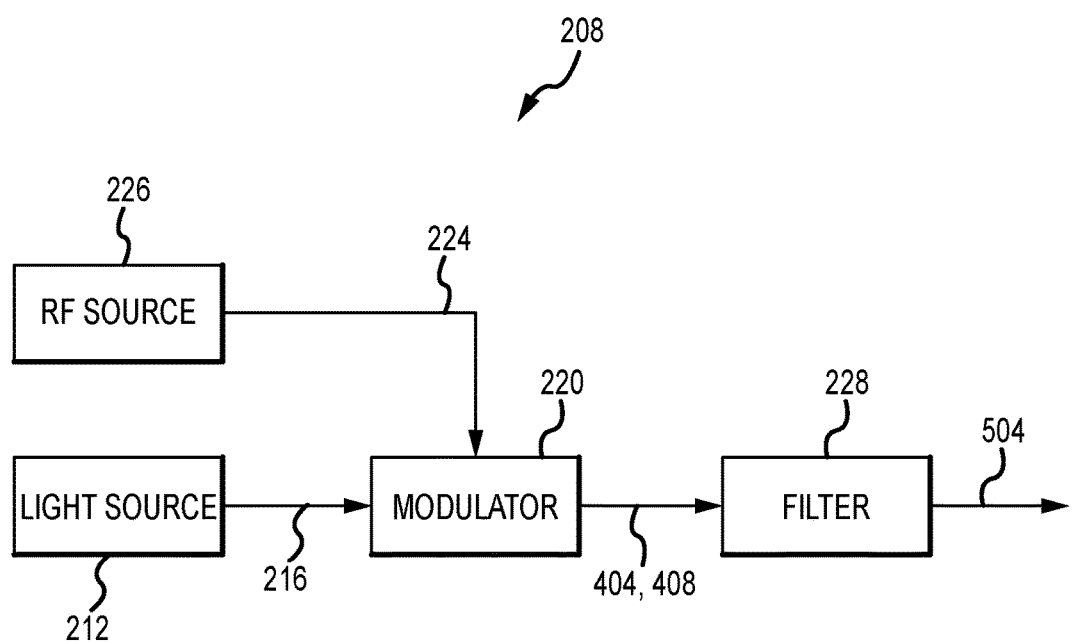
FIG. 3 is a block diagram depicting components of a transmission subassembly in accordance with embodiments of the present disclosure.

FIG. 2 is a block diagram depicting components of a transmitter 204 of a communication node 102 in accordance with embodiments of the present disclosure. The transmission components 204 include a plurality of transmission subassemblies 208. As illustrated in FIG. 3, each transmission subassembly 208 generally includes a light source 212 that provides light at a selected wavelength. As discussed in greater detail elsewhere herein, different light sources 212 included in different transmission subassemblies 208 output light at different selected wavelengths, with the different wavelengths comprising the optical carrier frequencies or wavelengths 216 of the communication system 100. More particularly, the carrier wavelengths 216 can be determined according to a scheme or arrangement of carrier wavelengths 216 for the communication system 100 that maintains a selected spacing between adjacent carrier wavelengths 216.

Figure 4A:
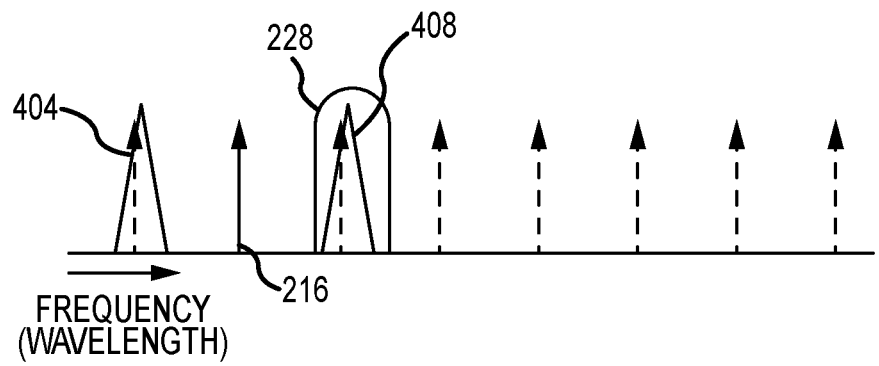
FIGS. 4A-4B depict example filtering arrangements in accordance with embodiments of the present disclosure.
Figure 4B:
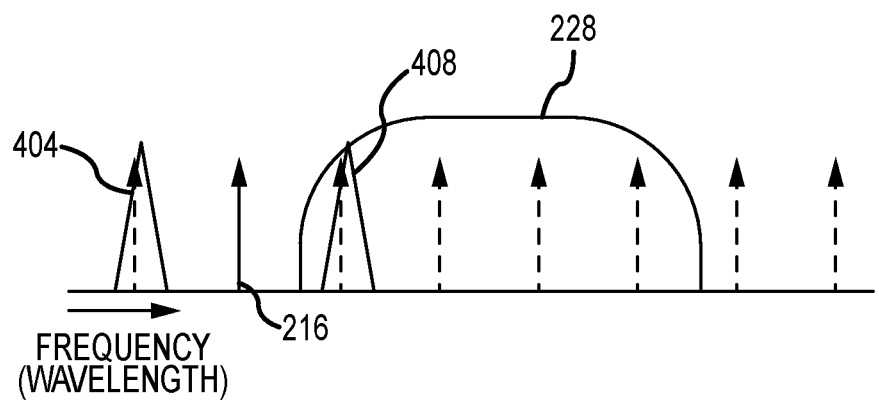

Each light source 212 is associated with a modulator 220. The modulator 220 receives the carrier wavelength 216 from the associated light source 212 as a first, optical input, and receives a radio frequency signal 224 that can include a radio frequency carrier or base band component and a radio frequency signal or data component as a second, radio frequency input. The radio frequency signal 224 can be provided by a radio frequency source 226, for example provided as part of a feed network that passes data signals and that provides a carrier signal for the different channels of the transmitter 204. The modulator 220 combines or modulates the received carrier wavelength 216 with the received radio frequency signal 224. The modulator 220 can comprise Mach-Zehnder modulator, an electro-optical modulator, or the like. As can be appreciated by one of skill in the art after consideration of the present disclosure, where the carrier wavelength 216 is modulated by a signal 224 that includes an RE baseband and an information signal, the result will be a waveform having two sidebands, with one of the sidebands on each side of the carrier wavelength. This is illustrated in FIGS. 4A and 4B, which depict a carrier wavelength 216 and the associated first 404 and second 408 sidebands that are produced by modulating the carrier wavelength 216 with a radio frequency signal 224 that includes a radio frequency carrier component and a radio frequency information component.

Figure 5:
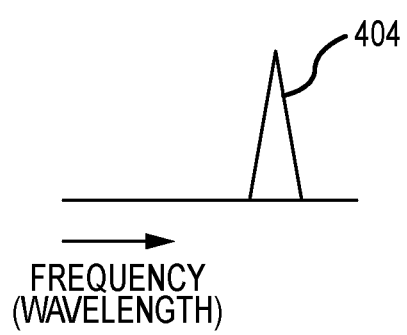
FIG. 5 depicts an example communication signal output by a transmission subassembly in accordance with embodiments of the present disclosure.

With reference again to FIG. 3, each modulator 220 is associated with a filter 228 that filters a signal output by the modulator 240 to produce a single sideband signal. In particular, and as depicted in FIGS. 4A and 4B, a filter 228 can be applied to remove one of the sidebands 404 or 408. In the example shown in FIG. 4A, the filter 228 is relatively narrow, and is configured to remove the second sideband 408. In the example shown in FIG. 4B, the filter 228 is relatively wide, and is again configured to remove the second sideband 408. The results of the filtration performed by the filter 228, whether configured as a narrow filter as depicted in FIG. 4A, or a relatively wide filter as depicted in FIG. 4B, is illustrated in FIG. 5. In particular, following removal of the second sideband 408 by the filter 228, only the first sideband 404 remains. As can be appreciated by one of skill in the art after consideration of the present disclosure, the filter 228 could alternatively be configured to remove the first sideband 404, leaving the second sideband 408. As yet another alternative, the single-side band can be generated with a different modulator or modulation scheme. The single sideband 404 (or 408) is then output from the transmission sub-assembly 208 as a communication signal 504.

With reference again to FIG. 2, the output (i.e. the remaining sideband 404 or 408) of each of a plurality of transmission sub-assemblies 208 within a group 236 of transmission subassemblies 208 is provided to a wavelength division multiplexer 232. The connection between each transmission sub-assembly 208 and the associated multiplexer 232 may be formed by optical fibers. As an example, but without limitation, the multiplexer 232 may comprise an arrayed waveguide multiplexer. In accordance with embodiments of the present disclosure, the transmission components 204 can include any number of transmission subassemblies 208 that have been grouped such that each group 236 provides communication signals 504 to one of the multiplexers 232. Each multiplexer 232 wavelength division multiplexes the received communication signals 504. Accordingly, the output 244 from the multiplexer 232 is a wavelength division multiplexed stream of all of the communication signals 504 from the associated group of transmission subassemblies 208.

Figure 6:
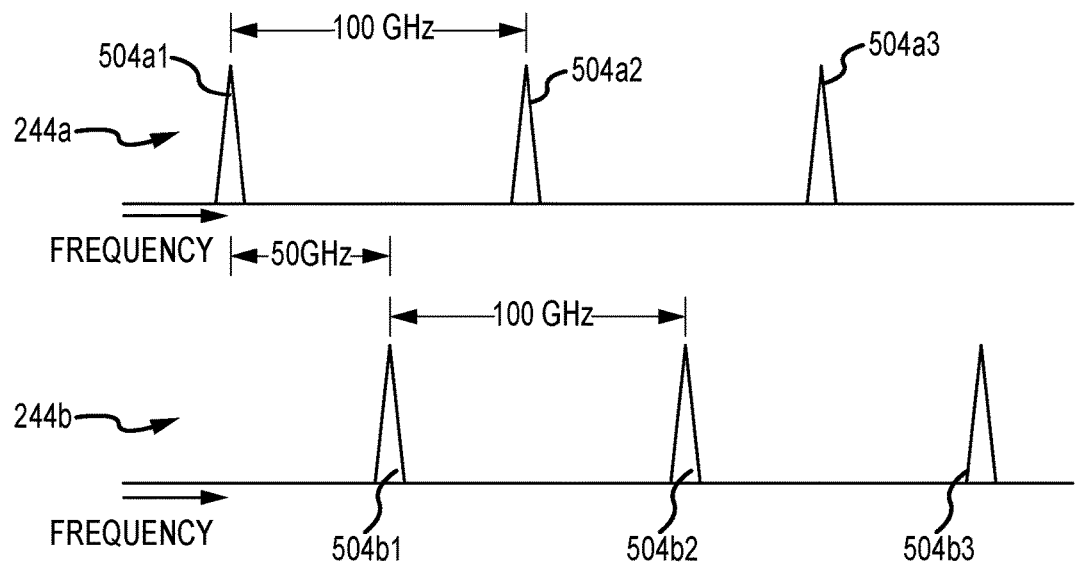
FIG. 6 is a depiction of an example wavelength spacing arrangement of communication signals after multiplexing in accordance with embodiments of the present disclosure.

In accordance with embodiments of the present disclosure, selected groups 236 of transmission subassemblies 208 can be configured such that the communication signals output therefrom are compatible with one another. More particularly, the frequency of the carrier frequency 216 plus the carrier band component of each communication signal 504 can be selected such that it does not overlap any other communication signal 504, or at least any other communication signal 504 having the same polarization, as described elsewhere herein. For example, and as depicted in FIG. 6, the multiplexed set 244a of communication signals 504 output from a first group 236a of transmission subassemblies 208 may be spaced apart from one another by a selected amount, while the multiplexed set 244b of communication signals 504 output from a second group 236b of transmission subassemblies 208 may spaced apart from one another by that selected amount (e.g. 100 GHz), plus they may be shifted by an offset of one half the selected amount (e.g. 50 GHz). As can be appreciated by one of skill in the art after consideration of the present disclosure, the frequency at which a particular communication signal 504 is centered depends on the respective carrier wavelength 216 and the RF baseband component of the radio frequency signal 224 that is mixed with that carrier wavelength. Accordingly, the carrier wavelengths 216 and RF baseband components of the RF signals 224 can be selected to provide the desired spacing between adjacent communication signals 504.

The output 244 of the multiplexer 232, comprising a multiplexed set of the communication signals 504 output from the filters 228 associated with the multiplexer 232, can next be provided to an optical amplifier 240. The connection between the multiplexer 232 and the optical amplifier 240 can be made by a single optical fiber. The optical amplifier outputs an amplified set of communication signals 248. As an example, but without limitation, the optical amplifier 240 may comprise a high power optical amplifier, such as an erbium-doped fiber amplifier (EDFM). The number of transmission subassemblies 208 within a group 236 may be selected based on the number of inputs available from a suitable optical amplifier 240, the performance characteristics of a suitable amplifier 240, or any other consideration.

Figure 7:
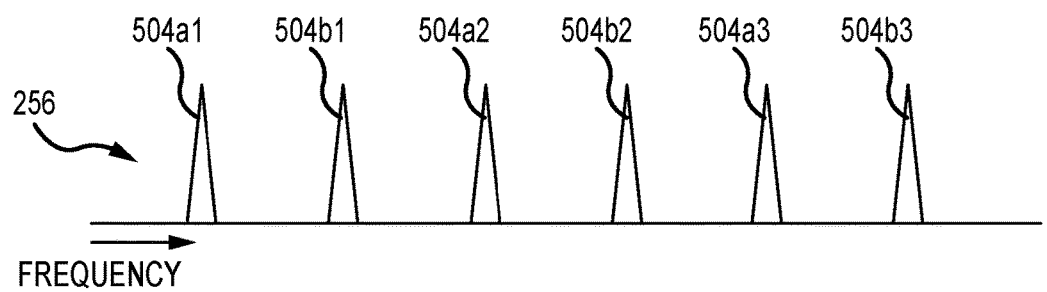
FIG. 7 is a depiction of an example wavelength spacing arrangement of communication signals after interleaving in accordance with embodiments of the present disclosure.

The multiplexed and amplified output 248 from a first optical amplifier 240a associated with a first group 236a of transmission subassemblies 208 and the multiplexed and amplified output 248 from a second optical amplifier 240b associated with a second group 236b of transmission subassemblies 208 can then be provided as inputs to an interleaver 252. The connection between the optical amplifiers 240 and the associated interleavers 252 can be established by optical fibers. As described and illustrated in FIG. 6, an example system 100 may include sets of communication signals 244a and 244b, labeled as 248a and 248b after amplification, having communication signals 504 that are regularly spaced in wavelength (frequency). In addition, the second set of communication signals 244b output from the second group 236b of transmission subassemblies 208 are shifted relative to the first set of communication signals 244a output from the first group 236a of transmission subassemblies 208. For example, the shift may be equal to one half the spacing between adjacent communication signals 244 within any one group 236a or 236b, as illustrated in FIG. 6. As a result, a combined signal 256 having twice the number and density of communication signals 504 as any one of the input signals 244a or 244b is output from the interleaver 244, as illustrated in FIG. 7. For instance, where the sets of communication signals 244a and 244b input to an interleaver 252a have a spacing of 100 GHz between communication signals 504, and where the shift between the sets 244a and 244b is 50 GHz, the resulting combined signal 256 output by the interleaver 252 has a spacing between communication signals 504 of 50 GHz.

In accordance with at least some embodiments of the present disclosure, the light comprising the carrier wavelengths 216 provided by the light sources 212 within the groups 236 of transmission subassemblies 208 providing an output 248 to a first interleaver 252a may have a first polarization, while the light comprising the carrier wavelengths 216 provided by the light sources 212 within the group 236b of transmission subassemblies 208 providing an output 248 to a second interleaver 252b may have a second polarization. Moreover, the first polarization can be orthogonal to the second polarization. For example, the light provided to and output from the first interleaver 252a can be P-polarized, while the light provided to and output from the second interleaver 252b can be S-polarized. Accordingly, the differently polarized combined communication signals 256a and 256b output from the first 252a and second 252b interleavers can be provided to a polarization combiner 260 that combines the sets of signals 256a and 256b to produce a polarization multiplexed signal 264. The combined communication signals 256 can be provided from the interleavers 252 to the polarization combiner 260 by optical fibers.

Figure 8:
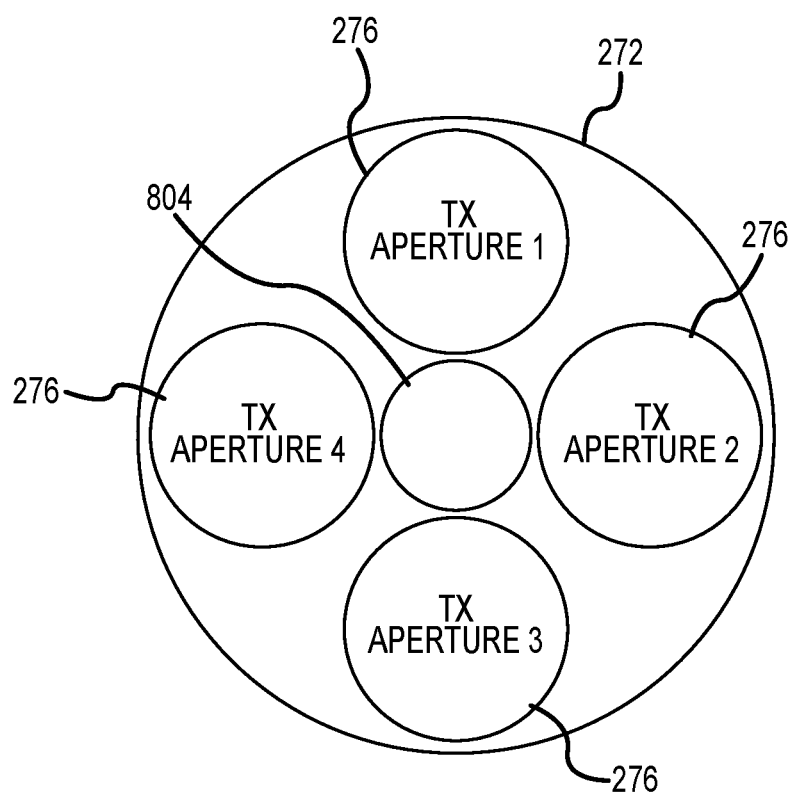
FIG. 8 depicts an arrangement of sub-apertures within a telescope aperture in accordance with embodiments of the present disclosure.

The output 264 from the polarization combiner 260 can be provided to beam control optics 268. In general, the beam control optics 268 can be in the form of free space optics that perform pointing, focusing, and stabilization functions. In accordance with at least some embodiments of the present disclosure, the output 264 from each polarization combiner 260 can be delivered to the free space optics 268 from separate apertures. In addition, the separate apertures can be delivered by the free space optics 268 to a telescope 272 having a common (single) aperture. For example, as depicted in FIG. 8, each of the sub apertures 276 may be arrayed about a central obscuration 804 of the telescope 272. The combined signals can then be transmitted from the telescope 272 as a multiplexed transmission signal 112 or 116 sent over a single transmission path 110. Alternatively, the outputs 264 from the polarization combiners 260 can be overlayed prior to deliver to the telescope 272. Moreover, the telescope 272 need not include a central obscuration.

In accordance with embodiments of the present disclosure, optical signals can be passed from the light sources 212 and through the intermediate components to the polarization combiners 260, over connections or links formed entirely or partially by optical fibers. In addition, the beam control optics 268 and the telescope 272 may comprise free space optics, apart from any included refractive optical elements.

As can be appreciated by one of skill in the art after consideration of the present disclosure, the transmission portion of a communication node 102 as disclosed herein can be implemented using any number of components. As an example, a communication node 102 capable of handling 256 channels includes 256 transmission sub-assemblies 208 that each have a light source 212, a radio frequency source 226, a modulator 220, and a filter 232. The example node 102 can additionally include 16 multiplexers 232, that each receive communication signals 504 from 16 transmission sub-assemblies 208. The node 102 can have 16 optical amplifiers 240, such that each multiplexer 232 is associated with one optical amplifier 240. The output from pairs of multiplexers 232, via the associated amplifiers 240, are provided to interleavers 252. Accordingly, the node 102 can include 8 interleavers 252. The outputs from pairs of interleavers 252 having orthogonally polarized communication signals 504 are provided to polarization combiners 260. The node 102 thus can include 4 polarization combiners 260. The output from each of the polarization combiners 260 is provided to a corresponding sub-aperture 276 of the telescope 272. However, other combinations and arrangements of components of a node 102 are possible.

As another example, a communication node 102 capable of handling 250 channels 504 can include 250 transmission sub-assemblies 208. The transmission sub-assemblies 208 can be divided into 10 groups 236 that each include 16 transmission sub-assemblies 208, and 6 groups 236 that each include 15 transmission sub-assemblies. The communication node 102 can include 16 multiplexers 232 that each receive signals 504 from a pair of transmission sub-assembly groups 236, with 10 of the multiplexers 232 multiplexing 16 channels 504 each, and 3 of the multiplexers multiplexing 15 channels 504 each. The multiplexed signals 248 from the multiplexers 232 may be provided to 8 interleavers 252, with each interleaver 252 receiving multiplexed signals 248 from two multiplexers 232 each. The interleaved signals 256 output by the interleavers 252 can be combined into 4 polarization multiplexed signals 264 by 4 polarization combiners 260, with each polarization combiner 260 receiving input from two interleavers 252. The output from each of the polarization combiners 260 can be provided to separate sub-apertures 276 of the telescope 270.

Figure 9:
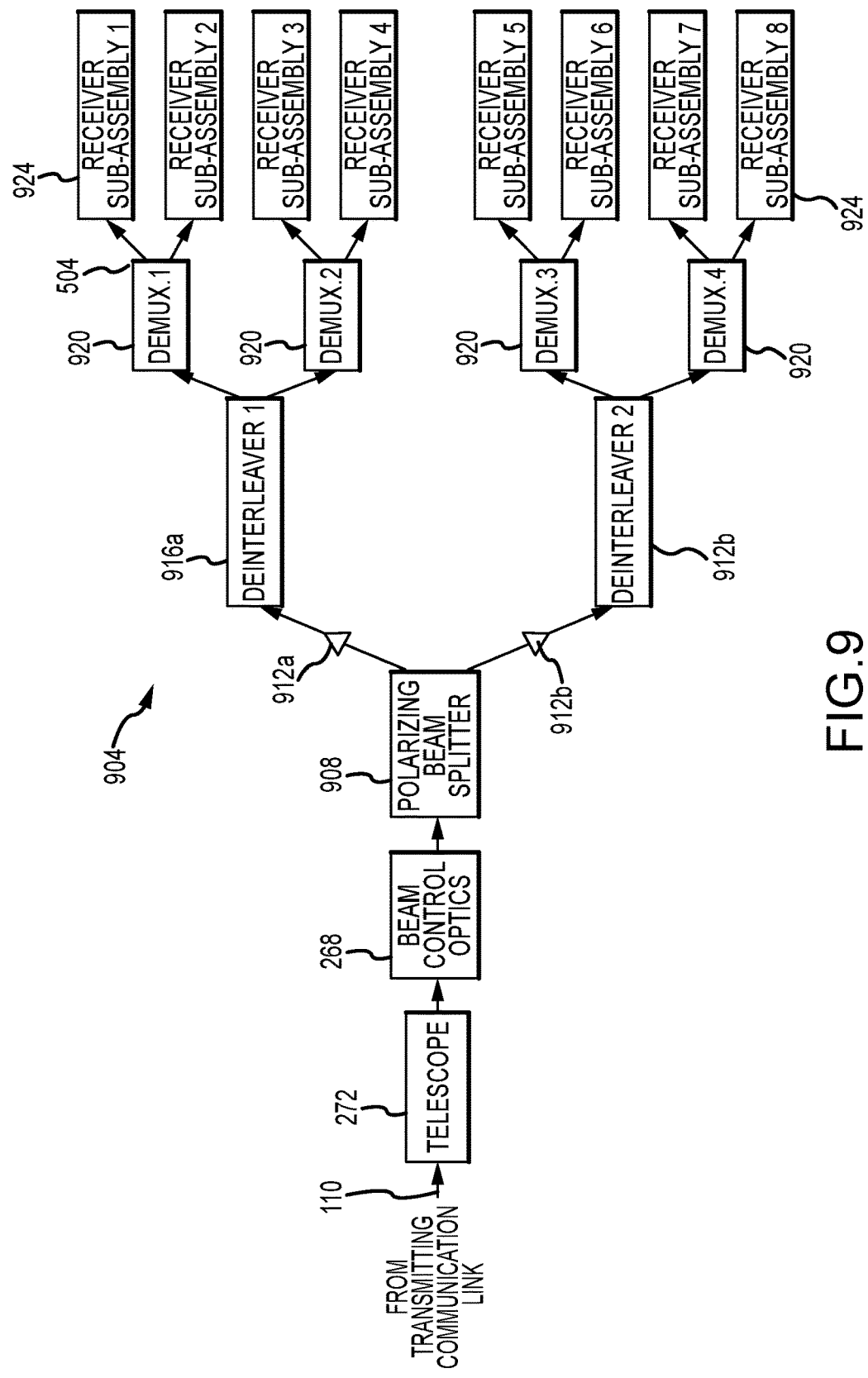
FIG. 9 is a block diagram depicting receive components of a communication system in accordance with embodiments of the present disclosure.

FIG. 9 is a block diagram depicting receive components 904 of a communication system in accordance with embodiments of the present disclosure. In this example, a beam containing a plurality of multiplexed signals, such as may be formed using a transmitter as depicted in FIG. 2, is received by a telescope 272. The received beam is directed by the telescope 272 to beam control optics 268. The beam control optics 268 in turn deliver the received beam to a polarizing beam splitter 908. The polarizing beam splitter 908 divides the received signals according to the polarization of the light. In this example, S-polarized light is directed to a first optical amplifier 912a and to a first optical deinterleaver 916a, and P-polarized light is directed to a second optical amplifier 912b and to a second optical deinterleaver 916b. More particularly, the polarizing beam splitter 908 can provide the differently polarized light to different optical fibers, which deliver the light to the optical amplifiers 912. Optical fibers can also connect the amplifiers 912 to the associated demultiplexers 920. Each of the deinterleavers 916 is in turn associated with a pair of demultiplexers 920. The demultiplexers 920 can divide the combined signals received from the deinterleavers 916 into individual communication channels. The connection between the deinterleavers 916 and the associated demultiplexers 920 can be made by optical fibers. Each individual communication signal 504 is directed to a receiver sub-assembly 924. The receiver sub-assembly 924 can include a local oscillator, mixer, and sensor (not shown) to demodulate and retrieve the original radio frequency data signal.

A communication node 102 of a communication system 100 can include both a transmitter and a receiver. In general, the transmitter and receiver can share a telescope 272 that transmits and receives signals across free space over a single communication path. The transmit components 204 of the node 102 can be configured as depicted in FIG. 2, while the receive components 904 of the node 102 can be configured as depicted in FIG. 9. In such embodiments, the light transmitted from the transmit components 204 can be provided to the beam control optics 268 by a beam splitter. The beam splitter can also provide received light to the receive components 904. The beam splitter can be in the form of a dichroic beam splitter, for example where the transmitted channels are within a different a different range of wavelengths from the received channels. As discussed in connection with the description of the components 204 and 904, the number of individual components can be varied.

Figure 10:
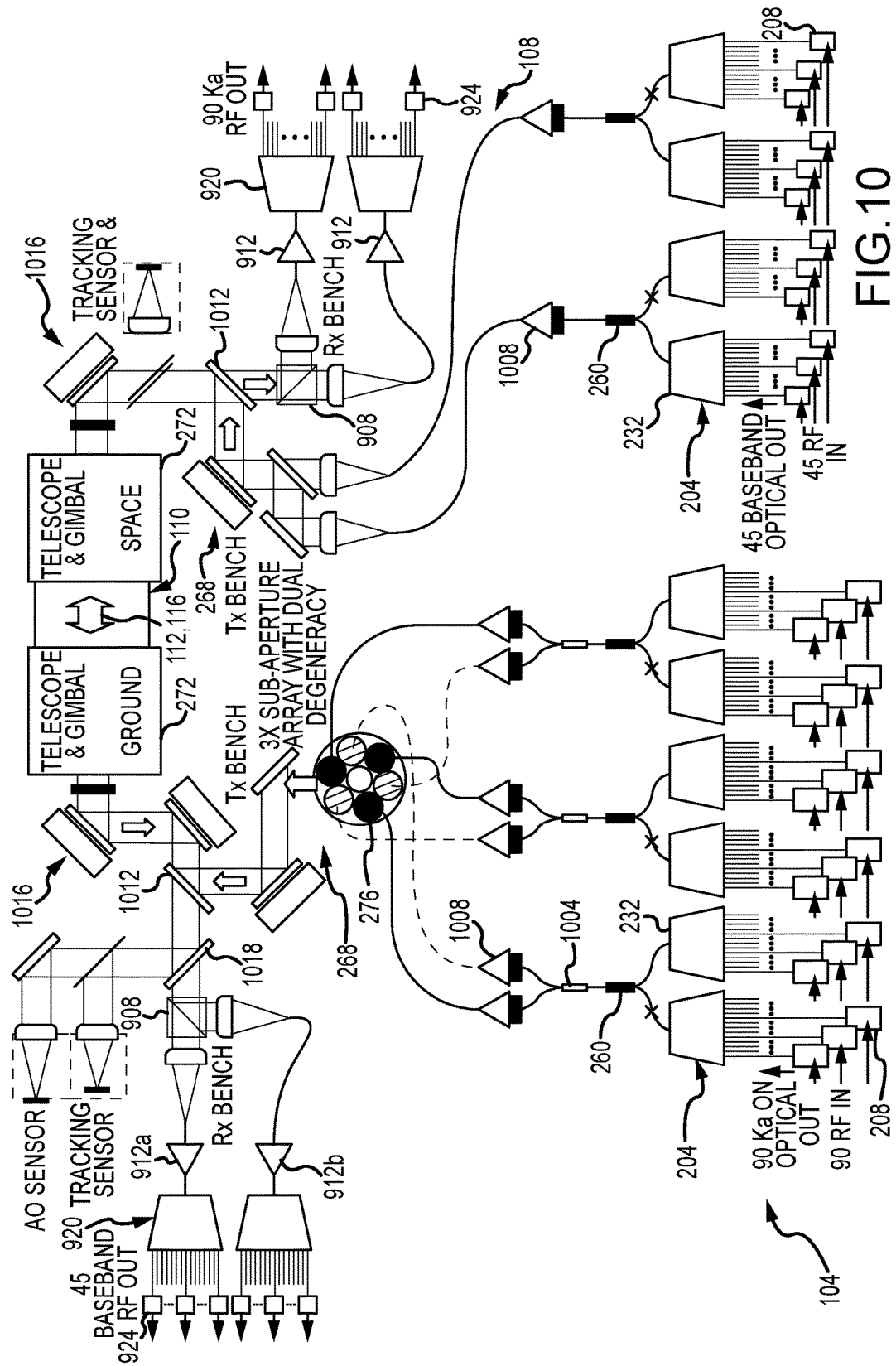
FIG. 10 is a block diagram depicting components of a communication system in accordance with embodiments of the present disclosure.

The nodes 102 of the system 100 can be configured the same or differently from one another. FIG. 10 depicts an example configuration of a communication system 100 in accordance with further embodiments of the present invention with of a space-based node 108 that is different than the ground-based node 104. In particular, in this example the number of communication channels that can be transmitted by the transmit components 204 of the space-based node 108 is less than the number of communication channels that can be transmitted by the transmit components 204 of the ground-based node 104, and the number of communication channels that one node 104 or 108 can receive matches the capacity of the transmitter of the other node 104 or 108.

The ground-based node 104 includes an example configuration of transmit components 204 that includes a plurality of transmission sub-assemblies 208. Each transmission sub-assembly 208 provides a signal to one of a plurality of multiplexers 232 over an optical fiber. The multiplexers 232 can be paired such that one multiplexer 232 in a pair receives P-polarized light from the associated transmission sub-assemblies 208, while the other multiplexer 232 in the pair receives S-polarized light from the associated sub-assemblies 208. The light from paired multiplexers 232 is then combined in polarization combiners 260. The combined light from each polarization combiner 260 can be divided by a fiber splitter 1004 into different fibers, with each fiber associated with an optical amplifier 1008 and a transmit sub-aperture 276. Transmit beam control optics 268 deliver the light in the sub-apertures 276 to a dichroic mirror 1012. In this example, the signals from the transmit components 204 of the ground-based node 104 have wavelengths that fall in the L band, and the dichroic mirror 1012 is configured to reflect light in the L-band. The L-band light is directed by the dichroic mirror 1012 to shared beam control optics 1016. The beam control optics 1016 deliver the light received from the dichroic mirror 1012 to the shared telescope 272.

The dichroic mirror 1012 of the ground-based node 104 is configured to transmit C-band light that has been received by the shared telescope 272 and that has passed through the shared beam control optics 1016 to the receive components 904 of the ground based node 108. In the illustrated example, the light passed by the dichroic mirror 1012 is passed through a partial mirror 1018, which directs a small portion (e.g. 5%) of the received light to a tracking sensor. The remaining light is passed to a polarizing beam splitter 908. Light of a first polarization is passed to an optical amplifier 912, while light of an orthogonal polarization is reflected to a different optical amplifier 912. Each optical amplifier 912 is associated with a demultiplexer 920. The demultiplexers 920 deliver the individual signals 504 to receiver sub-assemblies 924. Accordingly, the embodiment of FIG. 10 does not include a deinterleaver.

The transmit components 204 of the space-based node 108 include a plurality of transmission sub-assemblies 208. Each transmission sub-assembly 208 provides a signal to one of a plurality of multiplexers 232. The multiplexers 232 can be paired such that one multiplexer 232 in a pair receives P-polarized light from the associated transmission sub-assemblies 208, while the other multiplexer 232 in the pair receives S-polarized light from the associated sub-assemblies 208. The light from paired multiplexers 232 is then combined in polarization combiners 260, and amplified by optical amplifiers 1008. The amplified light is then delivered to transmit beam control optics 1016. Accordingly, the transmit components 204 of the space-based link 108 in this example do not incorporate multiple sub-apertures. The transmit beam control optics 1016 deliver the light containing the transmitted signals to a dichroic mirror 1012 mirror that reflects the light, which in this example is C-band light, to shared beam control optics 1016.

The dichroic mirror 1012 of the space-based node 108 is configured to transmit L-band light that has been received by the shared telescope 272 and that has passed through the shared beam control optics 1016 to the receive components 904 of the space-based node 108. The light passed by the dichroic mirror 1012 is provided to a polarizing beam splitter 908. Light of a first polarization is passed to an optical amplifier 912a, while light of an orthogonal polarization is reflected to a different optical amplifier 912b. Each optical amplifier 912 is associated with a demultiplexer 920. The demultiplexers 920 deliver the individual signals 504 to receiver sub-assemblies 924.

Figure 11:
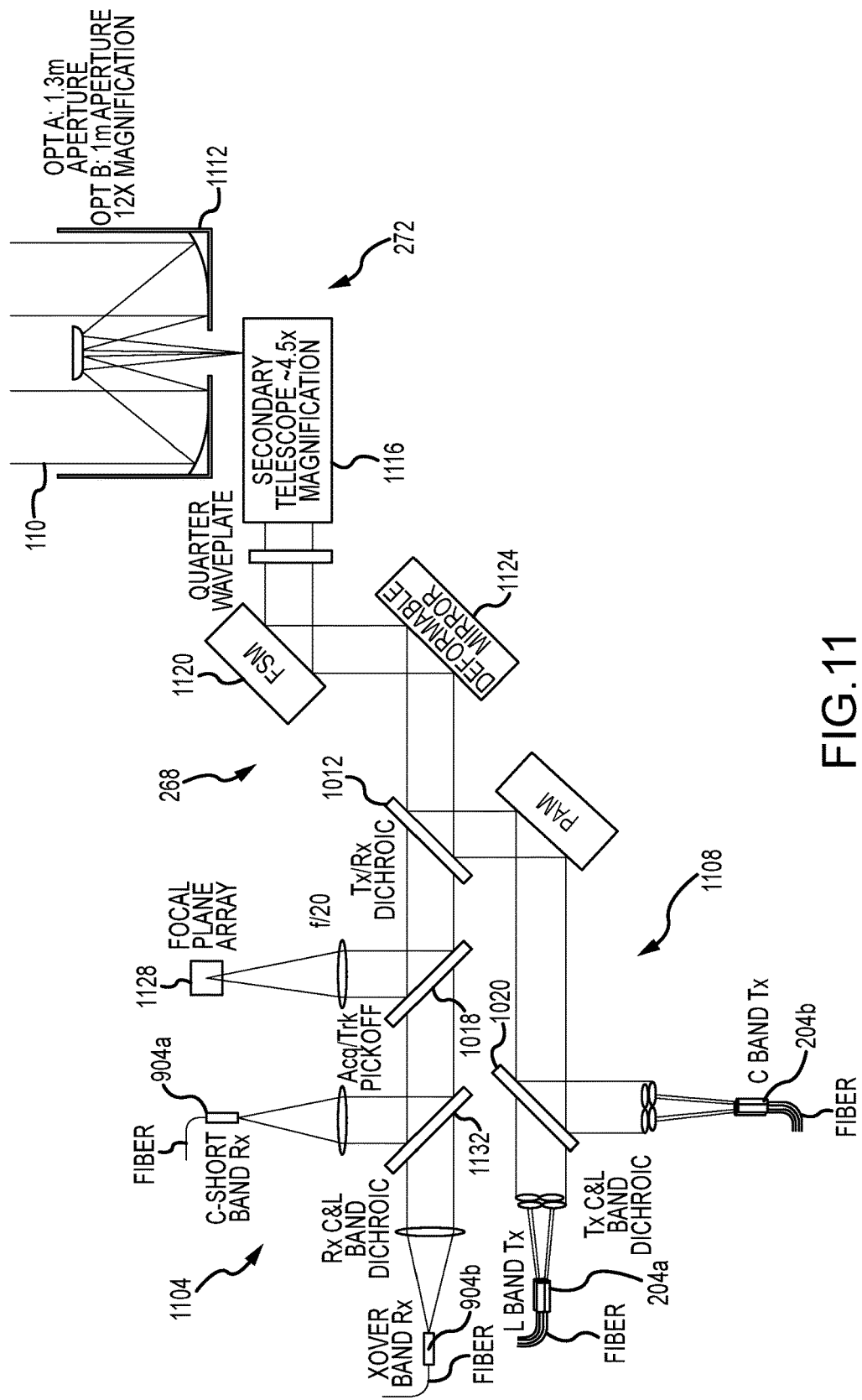
FIG. 11 is depiction of optical components of a ground-based transceiver in accordance with embodiments of the present disclosure.

FIG. 11 depicts optical components of a ground-based transceiver or node 104 in accordance with embodiments of the present disclosure. The components generally include a telescope 272, beam control optics 268, receive components 1104, and transmit components 1108. As depicted, communication signals are transmitted and received over a common path by a telescope 272. The telescope 272 can comprise primary telescope 1112 with reflective elements and having a central obscuration. The telescope 272 can also include a secondary telescope 1116 to provide an initial magnification. The beam control optics 268 can feature a fast steering mirror 1120 and a deformable mirror 1124 that can operate to point or align the signals.

A transmit/receive dichroic mirror 1012 divides the transmitted and received signals by wavelength. The received signals in this example are passed to the receive components 1104, which can include a partially transmissive mirror 1018 that directs some light to a focal plane array 1128 for acquisition and tracking of the received signal. The remainder of the light is provided to a receive dichroic mirror 1132, which divides the received signals according to wavelength. For example, C-short band signals are reflected to a first set of receive components 904a, while L-band signals are passed to a second set of receive components 904b. The receive components 904 are connected by optical fibers to deinterleavers 916, demultiplexers 920, and the receiver sub-assemblies 924, such as are illustrated in FIG. 9.

The transmit components 1108 can include a first set of transmit components 204a that provides L-band signals, and a second set of transmit components 204b that provides C-band signals. As depicted in the figure, the transmit components 204 can deliver signals through multiple sub-apertures. A dichroic element 1020 passes the L-band and reflects the C-band signals to deliver them to the transmit/receive dichroic mirror 1012.

Figure 12:
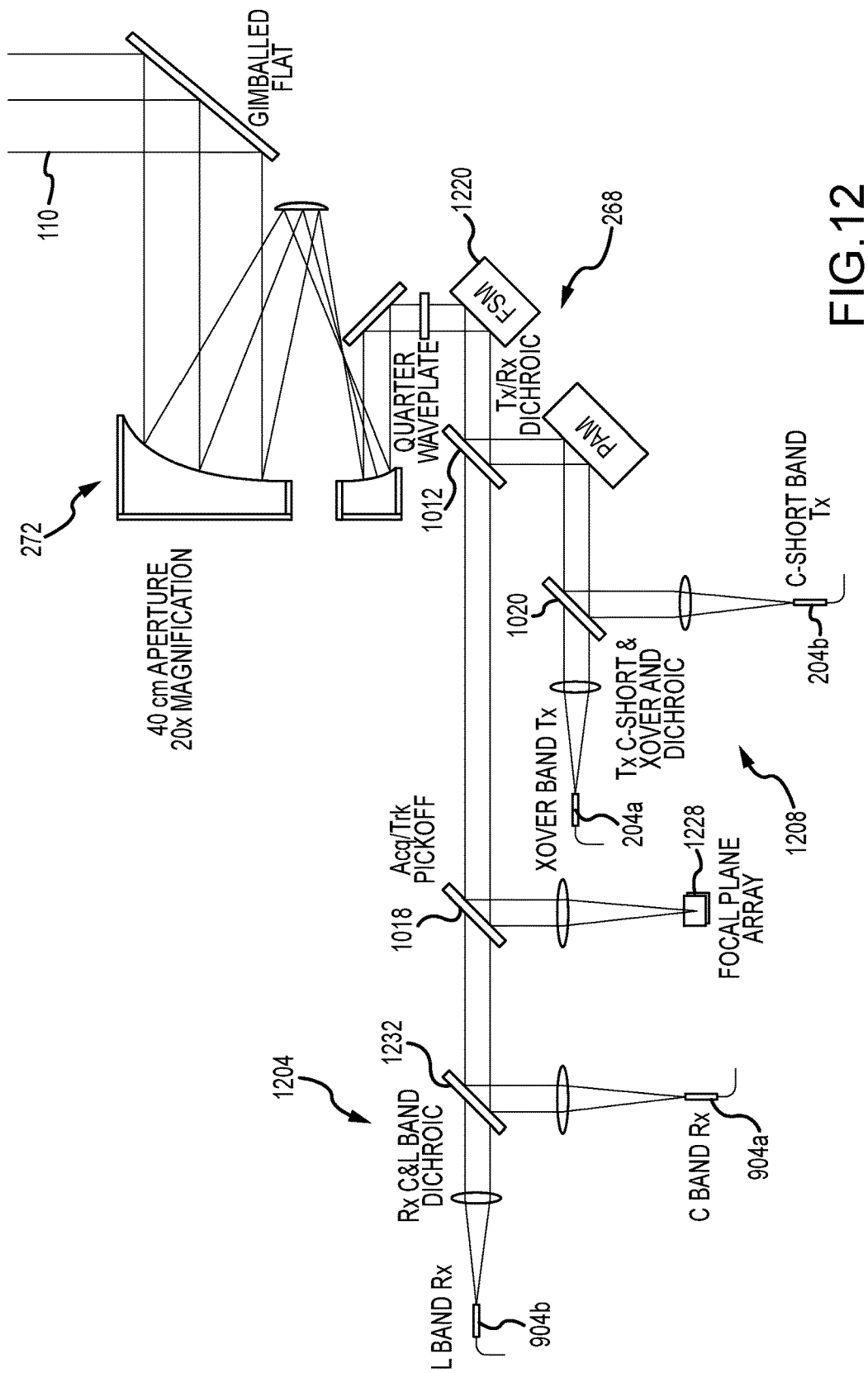
FIG. 12 is a depiction of optical components of a space-based transceiver in accordance with embodiments of the present disclosure.

FIG. 12 depicts optical components of a space-based transceiver or node 108 in accordance with embodiments of the present disclosure. The components generally include a telescope 272, beam control optics 268, receive components 1204, and transmit components 1208. As depicted, communication signals are transmitted and received over a common communication path 110 by the telescope 272. In this example, the telescope 272 is configured so that it is free from any central obscuration. The beam control optics 268 can feature a fast steering mirror 1220 that can operate to point or align the signals.

A transmit/receive dichroic mirror 1012 divides the transmitted and received signals by wavelength. The received signals in this example are passed to the receive components 1204, which can include a partially transmissive mirror 1018 that directs some light to a focal plane array 1228 for acquisition and tracking of the received signal. The remainder of the light is provided to a receive dichroic mirror 1232, which divides the received signals according to wavelength. For example, C-short band signals are reflected to a first set of receive components 904a, while L-band signals are passed to a second set of receive components 904b.

The transmit components 1208 can include a first set of transmit components 204a that provides L-band signals, and a second set of transmit components 204b that provides C-band signals. As depicted in the figure, the transmit components 204 can deliver signals through multiple sub-apertures. A dichroic element 1020 passes the L-band and reflects the C-band signals to deliver them to the transmit/receive dichroic mirror 1012.

Figure 13:
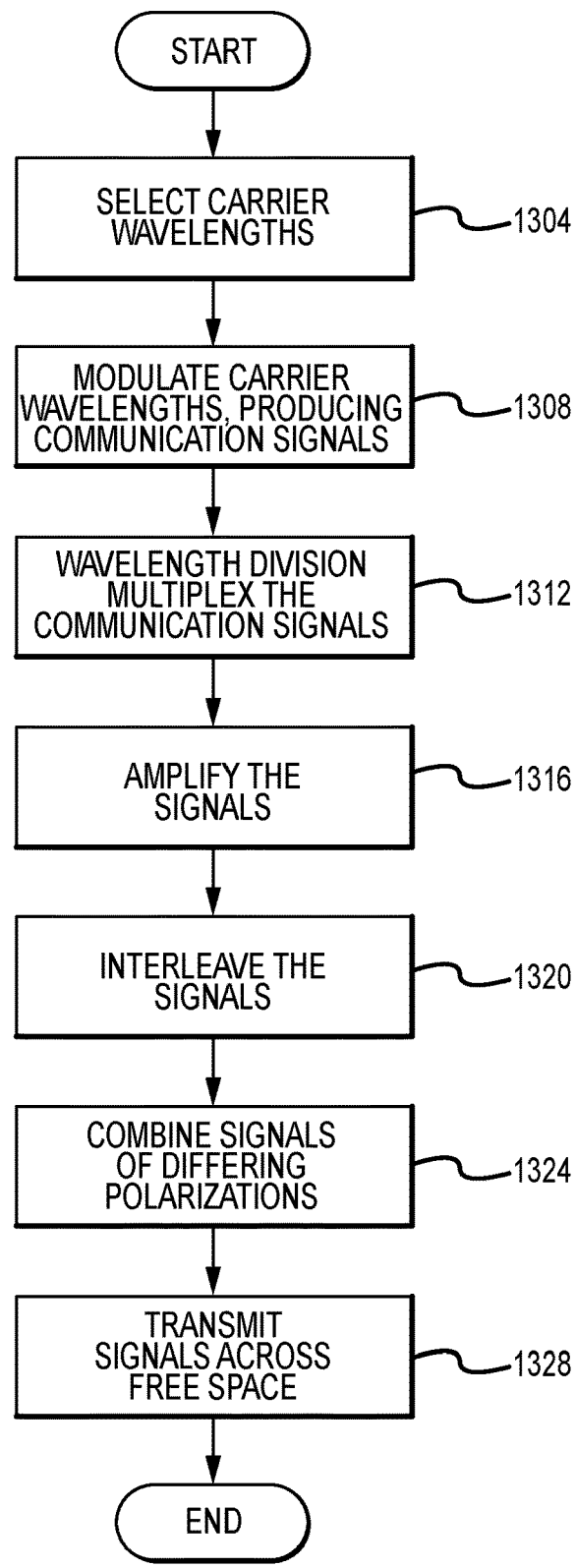
FIG. 13 depicts aspects of methods for multiplexing communication signals in a communication node in accordance with embodiments of the present disclosure.

Aspects of methods for multiplexing communication signals in a communication node 102 in accordance with embodiments of the present disclosure are depicted in FIG. 13. Initially, at step 1304, a set of carrier wavelengths 216 for the communication system 100 is selected. In general, the wavelengths 216 are selected to provide a specific spacing between signals after a step of multiplexing on a transmission side, and before a step of demultiplexing on a receiving side, of the communication system 100. In addition, at least some of the carrier wavelengths 216 are shifted in frequency with respect to other carrier wavelengths 216 in the system. Furthermore, a first half of the carrier wavelengths 216 may be polarized orthogonally with respect to a second half of the carrier wavelengths 216. As discussed in greater detail elsewhere herein, the orthogonal polarization of carrier wavelengths 216 allows for the wavelengths to be duplicated between the two halves.

The carrier wavelengths 216 are generated by the transmitting communication node 102 and are modulated with radio frequency signals 224 to produce communication signals 504 (step 1308). The radio frequency signals can include a radio frequency baseband component and an information component. The information component can be obtained from feed electronics associated with the communication node 102. In accordance with at least some embodiments of the present disclosure, the baseband component is the same or is within a selected range for all of the carrier wavelengths 216, in order to maintain the selected spacing between signals.

At step 1312, each of the communication signals 504 is passed to a multiplexer 232 and wavelength division multiplexed onto an optical fiber. The multiplexed signal can then be amplified by an optical amplifier 240 (step 1316). The multiplexed signals from a pair of multiplexers 232, after amplification, are then interleaved with one another in an interleaver 252 (step 1320). In accordance with at least some embodiments of the present disclosure, the pair of multiplexed signals includes individual communication signals 504 with a spacing that is the same in each set, but with the communication signals 504 in one of the sets offset by an amount equal to that spacing. As a result, the output of the interleaver 252 is a combined wavelength division multiplexed signal 256 with a spacing between channels that is half the spacing between channels in the signals originally output by the multiplexers 232.

The light comprising the combined wavelength division multiplexed signal 256 from a first interleaver 252 may have a polarization that is orthogonal to the light comprising the combined wavelength division multiplexed signal 256 from a second interleaver 252. The orthogonally polarized signals 256 can then be overlayed with one another by a polarization combiner 260 (step 1324). The signal from the polarization combiner 260 can then be provided to a telescope for transmission across free space to receiving communication node 102 (step 1328). In accordance with at least some embodiments of the present disclosure, providing a signal from a polarization combiner can include providing the signal to a sub-aperture of the telescope. The transmission process can then end.

Figure 14:
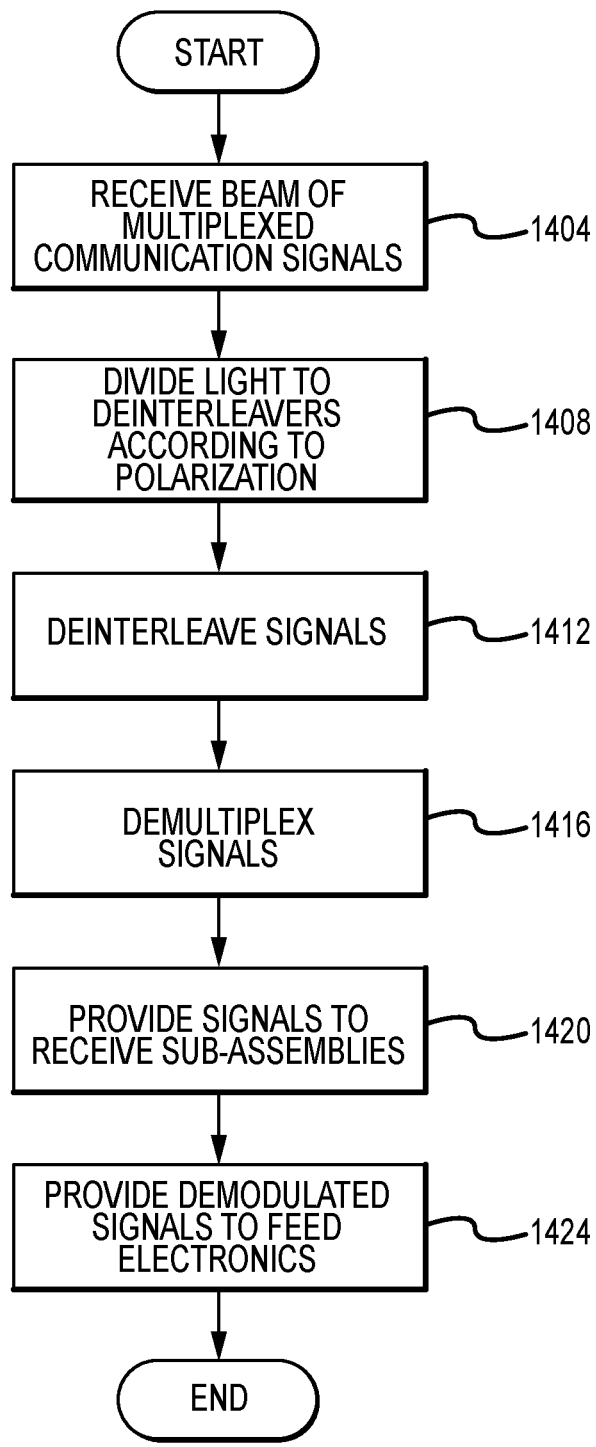
FIG. 14 depicts aspects of methods for demultiplexing communication signals in a communication node in accordance with embodiments of the present disclosure.

Aspects of a method for demultiplexing a received communication signal in a communication node 102 in accordance with embodiments of the present disclosure are illustrated in FIG. 14. Initially, at step 1404, a beam comprising a communication signal is received at the telescope of a communication node 102. The received light is directed to a polarizing beam splitter 908, which directs light of a first polarization to a first deinterleaver 916, and which directs light of a second polarization to a second deinterleaver 916 (step 1408). The interleaver separates the received signal into first and second wavelength division multiplexed signals (step 1412). The wavelength division multiplexed signals are provided to first and second demultiplexers 920 that demultiplex the combined signals (step 1416). The demultiplexed communication signals 504 obtained from the received multiplexed signals are each directed to a respective receive sub-assembly 924 for demodulation (step 1420). The communication signals can then be retrieved and provided to feed electronics (step 1424). The receive process can then end.

Embodiments of the disclosure can employ advance technologies such as Microwave Photonics (MWP), which is a mixture of microwave and photonic components enabling microwave signal transport and processing in the optical domain on photonic integrated circuits (PICs) and vice versa. The disclosed systems and methods may also employ a Deep Learning (DL) architecture and algorithm set to automatically determine unique feature extractors associated with network conditions such as atmospheric degradation, chromatic dispersion, and polarization rotation between input (e.g., ground terminal) and output nodes (e.g., space-based satellite) of a free-space communication link architecture involving multiple DWDM wavelengths multiplexed and or modulated with other signals (e.g., RF), in different polarizations, a diversity of spatial configurations, diversity of spectral configurations, different formats, and different symbol rates. The unique feature extractor information associated with network conditions such as atmospheric degradation can then be used in the DWDM architecture to optimize free space optical transmission conditions such as providing additional information to an adaptive optics deformable mirror used to correct for atmospheric dispersions of transmitted signals.

At least some embodiments of the disclosed systems and methods can be characterized as employing a unique combination of optical multiplexing of wavelengths with RF modulation, single side-band suppression, polarization multiplexing, spatial multiplexing, and wavelength multiplexing to optimize and enhance the transmission of DWDM signals in a free-space communication system with high frequency modulation. Various embodiments can employ advanced technologies such as MWP. While communications systems have been developed that operate through a single or multiple mode fiber, embodiments of the present disclosure are optimized for DWDM transmitting through free space while minimizing atmospheric degradation. The use of deep learning feature extractor information associated with network conditions such as atmospheric degradation can be used in the DWDM architecture to optimize free space optical transmission conditions such as providing additional information to an adaptive optics deformable mirror used to correct for atmospheric dispersions of transmitted signals.

Systems in accordance with at least some embodiments of the present disclosure can include a laser communication system comprised of a unique combination of a plurality of methods for combining multiple wavelengths within a DWDM system wherein each wavelength is modulated with a plurality of RF data, wherein one of the RF modulated wavelength's sideband and carrier frequency are suppressed optimally to provide compact spacing between an adjacent suppressed RF modulated wavelength, wherein the wavelengths may be suppressed with individual filters, offset wider-band filters with greater channel spacing, or with offset optical carriers from specified frequency grid, wherein the said one-sided suppressed RF modulated wavelengths are combined using wavelength-division multiplexing (WDM) with waves of either orthogonal polarization states (i.e., s and p) and amplified in an optical amplifier, wherein wavelength polarized in the s-state is spatially combined in an optimal fashion with a wavelength polarized in the p-state to create an optimally spaced polarized wavelength pair sub-aperture either in fiber or in free-space, wherein multiple wavelength sub-aperture pairs are combined but spatially separated in an optimum spacing from other multiple wavelength sub-aperture pairs to provide a larger aperture comprising multiple wavelength sub-apertures enabling maximum bandwidth in a wavelength grid, wherein the large wavelength aperture comprising of multiple sub-apertures combined is transmitted in free space to a communication receiver in another location such as a satellite, and/or wherein the system contains dichroic filters to combine bands of wavelengths/channels to allow for bi-directional communication. The system can utilize polarization multiplexing to combine optical beams from multiple optical amplifiers. The wavelength division multiplexing can be used to combine the outputs of multiple amplifiers with multiple wavelengths and polarization into a single optical path. Multiple beams are spatially combined into a single emitting aperture to minimize atmospheric degradations and prevent obscuration. Deep learning architectures and algorithms can be applied to automatically determine unique feature extractors associated with network conditions such as atmospheric degradation, chromatic dispersion, and polarization rotation between input (e.g., ground terminal) and output nodes (e.g., space based satellite) of a free-space communication link architecture involving multiple DWDM wavelengths multiplexed and or modulated with other signals (e.g., RF), in different polarizations, a diversity of spatial configurations, a diversity of spectral configurations. The unique feature extractor information associated with network conditions such as atmospheric degradation can then be used in the DWDM architecture to optimize free space optical transmission conditions such as providing additional information to an adaptive optics deformable mirror used to correct for atmospheric dispersions of transmitted signals, wherein the DL architecture employs multiple hidden layers between its input and output layer, wherein the extra hidden layers of the architecture enable automatic feature extraction, and wherein once trained, the DL can be used in multiple scenarios without needing to be trained on large data sets again since the feature extractors developed during training has a highly invariant memory.

In accordance with at least some embodiments of the present disclosure, the technology encompasses:

(1) A communication system, comprising:
a transmitter, including:
a plurality of light sources, wherein each light source is operable to output at least one optical carrier frequency;
a plurality of modulators, wherein each carrier frequency is associated with a modulator, and wherein each modulator is operable to modulate the associated carrier frequency with a radio frequency signal, wherein the modulators form modulated signals;
a plurality of multiplexers, wherein each multiplexer is operable to combine modulated signals from at least two of the modulators, wherein the multiplexers form wavelength division multiplexed signals;
a plurality of interleavers, wherein each interleaver is operable to combine wavelength division multiplexed signals from at least two of the multiplexers, wherein the interleavers form sets of interleaved signals; and
free space optics, wherein the sets of interleaved signals are output by the free space optics.

(2) The communication system of (1), further comprising:
beam control optics, wherein the beam control optics include a plurality of transmit apertures, wherein each transmit aperture is operable receive the signals from the multiplexers and to output at least one of the sets of interleaved signals to the free space optics.

(3) The communication system of (2), wherein each transmit aperture outputs a different set of interleaved signals to the free space optics.

(4) The communication system of any of (1) to (3), wherein the combined modulated signals from a first modulator in the plurality of modulators have a first polarization.

(5) The communication system of (4), wherein the combined modulated signals from a second modulator in the plurality of modulators have the first polarization, wherein the combined modulated signals from a third modulator in the plurality of modulators have a second polarization, wherein the combined modulated signals from a fourth modulator in the plurality of modulators have the second polarization.

(6) The communication system of any of (1) to (5), further comprising:
a plurality of polarization combiners, wherein an input of each polarization combiner is connected to an output of each of at least two associated interleavers.

(7) The communication system of (4), wherein for each polarization combiner the interleaved signals from a first one of the associated interleavers have the first polarization and the interleaved signals from a second one of the associated interleavers have a second polarization.

(8) The communication system of any of (1) to (7), wherein an output of a first polarization combiner in the plurality of polarization combiners is connected to a first transmit aperture included in the plurality of transmit apertures, and wherein an output of a second polarization combiner in the plurality of polarization combiners is connected to a second transmit aperture included in the plurality of transmit apertures.

(9) The communication system of any of (1) to (8), wherein the transmitter includes four transmit apertures.

(10) The communication system of any of (1) to (9), further comprising:

a plurality of optical amplifiers, wherein each multiplexer is associated with at least one of the optical amplifiers, and wherein each optical amplifier provides an output that is received at an input of a corresponding interleaver.

(11) The communication system of any of (1) to (10), further comprising: a receiver, wherein the receiver includes a single receiver aperture, and wherein at least the first and second sets of interleaved signals transmitted from the plurality of transmit apertures of the transmitter are received by the single aperture of the receiver.

(12) The communication system of 11, wherein the transmitter is ground-based, and wherein the receiver is space-based.

(13) The communication system of any of (1) to (12), wherein each modulator is operable to modulate a carrier frequency received from a corresponding light source with a radio frequency carrier signal and a radio frequency information signal.

In accordance with further aspects of the present disclosure, the technology encompasses:

(14) A communication system, comprising:

a plurality of transmission sub-assemblies, wherein each transmission sub-assembly includes:

a light source, wherein the light source includes an output, and wherein the light source is operable to output light of a selected wavelength;

a radio frequency input;

a modulator, wherein the modulator includes a first input that is connected to the output of the light source, wherein the modulator includes a second input that is operable to receive a radio frequency signal, and wherein the modulator is operable to modulate the light of the selected wavelength received from the light source with the radio frequency signal to form a modulated signal;

a filter, wherein the filter is operable to remove a first side of the modulated signal to form a channel;

a plurality of multiplexers, wherein each multiplexer in the plurality of multiplexers receives communication signals from a plurality of the transmission sub-assemblies, and wherein each multiplexer in the plurality of multiplexers places a channel from each of the associated transmission sub-assemblies onto a single fiber optic element;

a plurality of interleavers, wherein each interleaver is associated with a different pair of multiplexers in the plurality of multiplexers, and wherein each interleaver places channels from the associated pair of multiplexers onto a single fiber optic element.

(15) The communication system of (14), further comprising:

a plurality of polarization combiners, wherein each polarization combiner is associated with a different pair of interleavers in the plurality of interleavers, wherein the channels from a first interleaver in the first pair of interleavers includes light of a first polarization, and wherein the channels from a second interleaver in the first pair of interleavers includes light of a second polarization.

In accordance with still other aspects of the present disclosure, the technology encompasses:

(16) A communication method, comprising:

selecting a set of carrier wavelengths, wherein each carrier wavelength in the set of carrier wavelengths is spaced apart from a neighboring carrier wavelength by a selected amount;

modulating a plurality of the carrier wavelengths in the set of carrier wavelengths to create a plurality of signals;

multiplexing the plurality of signals, wherein at least first and second subsets of the signals in the plurality of signals are placed on at least first and second optical fibers;

interleaving the first and second subsets of the plurality of signals, wherein the first and second subsets of the plurality of signals are placed on a third optical fiber.

(17) The method of (16), further comprising:

combining signals in the plurality of signals having different polarizations, wherein the signals on the third optical fiber have a first polarization, wherein third and fourth subsets of the signals in the plurality of signals are placed on at least fourth and fifth optical fibers, wherein the third and fourth subsets of the plurality of signals are placed on a sixth optical fiber, wherein the signals on the sixth optical fiber have a second polarization, and wherein the signals from the third optical fiber and the signals from the sixth optical fiber are placed on a seventh optical fiber.

(18) The method of (17), further comprising:

delivering the signals from the seventh optical fiber to a first sub-aperture of a first telescope;

delivering signals from an eighth optical fiber to a second sub-aperture of the first telescope; and transmitting the signals from the first and second sub-apertures across free space.

(19) The method of (18), further comprising:

receiving the signals transmitted from the first and second sub-apertures at a receiving node, wherein the signals from the first and second sub-apertures are received through a single aperture of a second telescope.

(20) The method of (19), further comprising transmitting third and fourth sets of signals through the second telescope to the first telescope, wherein the third and fourth sets of signals are not delivered to the second telescope using sub-apertures.

The foregoing discussion has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A communication system, comprising:

a transmitter, including:

plurality of light sources, wherein each light source is operable to output at least one optical carder frequency;

a plurality of modulators, wherein each carrier frequency is associated with a modulator, wherein each modulator is operable to modulate the associated carrier frequency with a radio frequency signal, and wherein the modulators form modulated signals;

a plurality of multiplexers, wherein each multiplexer is operable to combine modulated signals from at least two of the modulators, wherein the multiplexers form wavelength division multiplexed signals;

a plurality of interleavers, wherein each interleaves is operable to combine wavelength division multiplexed signals from at least two of the multiplexers, wherein the interleavers form sets of interleaved signals;

free space optics, wherein the sets of interleaved signals are output by the free space optics; and beam control optics, wherein the beam control optics include a plurality of transmit apertures, wherein each transmit aperture is operable to receive the signals from the multiplexers and to output at least one of the sets of interleaved signals to the free space optics.

2. The communication system of claim 1, wherein each transmit aperture outputs a different set of interleaved signals to the free space optics.

3. The communication system of claim 2, wherein a first modulated signal from a first modulator in the plurality of modulators has a first polarization.

4. The communication system of claim 3, wherein a second modulated signal from a second modulator in the plurality of modulators has the first polarization, wherein a third modulated signal from a third modulator in the plurality of modulators has a second polarization, and wherein a fourth modulated signal from a fourth modulator in the plurality of modulators has the second polarization.

5. The communication system of claim 4, further comprising:

a plurality of polarization combiners, wherein an input of each polarization combiner is connected to an output of each of at least two associated interleavers.

6. The communication system of claim 5, wherein for each polarization combiner in the plurality of polarization combiners the interleaved signals from a first one of the associated interleavers have the first polarization and the interleaved signals from a second one of the associated interleavers have the second polarization.

7. The communication system of claim 6, wherein an output of a first polarization combiner in the plurality of polarization combiners is connected to a first transmit aperture included in the plurality of transmit apertures, and wherein an output of a second polarization combiner in the plurality of polarization combiners is connected to a second transmit aperture included in the plurality of transmit apertures.

8. The communication system of claim 7, wherein the transmitter includes four transmit apertures.

9. The communication system of claim 8, further comprising:

a plurality of optical amplifiers, wherein each multiplexer is associated with at least one of the optical amplifiers, and wherein each optical amplifier provides an output that is received at an input of a corresponding interleaver.

10. The communication system of claim 1, further comprising:

a receiver, wherein the receiver includes a single receiver aperture, and wherein at least the first and second sets of interleaved signals transmitted from the plurality of transmit apertures of the transmitter are received by the single aperture of the receiver.

11. The communication system of claim 10, wherein the transmitter is ground-based, and wherein the receiver is space-based.

12. The communication system of claim 1, wherein each modulator is operable to modulate a carrier frequency received from a corresponding light source with a radio frequency carrier signal and a radio frequency information signal.

13. A communication system, comprising:

a plurality of transmission sub-assemblies, wherein each transmission sub-assembly includes:

a light source, wherein the light source includes an output, and wherein the light source is operable to output light of a selected wavelength;

a radio frequency input;

a modulator, wherein the modulator includes a first input that is connected to the output of the light source, wherein the modulator includes a second input that is operable to receive a radio frequency signal from the radio frequency input, and wherein the modulator is operable to modulate the light of the selected wavelength received from the light source with the radio frequency signal to form a modulated signal;

a filter, wherein the filter is operable to remove a first sideband of the modulated signal to form a channel;

a plurality of multiplexers, wherein each multiplexer in the plurality of multiplexers receives communication signals from different sets of transmission sub-assemblies, wherein each set includes a plurality of transmission sub-assemblies, and wherein each multiplexer in the plurality of multiplexers places a channel from each of the associated transmission sub-assemblies onto a single fiber optic element;

a plurality of interleavers, wherein each interleaver is associated with a different pair of multiplexers in the plurality of multiplexers, and wherein each interleaver places channels from the associated pair of multiplexers onto a single fiber optic element; and a plurality of polarization combiners, wherein each polarization combiner is associated with a different pair of interleavers in the plurality of interleavers, wherein the channels from a first interleaver in a first pair of interleavers includes light of a first polarization, and wherein the channels from a second interleaver in the first pair of interleavers includes light of a second polarization.

14. A communication method, comprising:

selecting a set of carrier wavengths, wherein each carrier wavelength in the set of carrier wavelengths is spaced apart from a neighboring carrier wavelength by a selected amount;

modulating a plurality of the carrier wavelengths in the set of carrier wavelengths to create a plurality of signals;

multiplexing a first subset of the signals included in the plurality of signals, wherein the first subset of signals is placed on a first optical fiber;

multiplexing a second subset of the signals included in the plurality of signals, wherein the second subset of signals is placed on a second optical fiber;

interleaving the first and second subsets of signals included in the plurality of signals, wherein the first and second subsets of signals included in the plurality of signals are placed on a third optical fiber, and wherein the signals on the third optical fiber have a first polarization;

multiplexing a third subset of the signals included in the plurality of signals, wherein the third subset of signals is placed on a fourth optical fiber, multiplexing, a fourth subset of the signals included in the plurality of signals, wherein the fourth subset of signals is placed on a fifth optical fiber;

interleaving the third and fourth subsets of signals included in the plurality of signals, wherein the third and fourth subsets of the plurality of signals are placed on a sixth optical fiber, and wherein the signals on the sixth optical fiber have a second polarization; and combining signals in the plurality of signals having different polarizations, wherein the signals from the third optical fiber and the signals from the sixth optical fiber are placed on a seventh optical fiber.

15. The method of claim 14, further comprising:

delivering the signals from the seventh optical fiber to a first sub-aperture of a first telescope;

delivering signals from an eighth optical fiber to a second sub-aperture of the first telescope; and transmitting the signals from the first and second sub-apertures across free space.

16. The method of claim 15, further comprising:

receiving the signals transmitted from the first and second sub-apertures at a receiving node, wherein the signals from the first and second sub-apertures are received through a single aperture of a second telescope.

17. The method of claim 16, further comprising transmitting third and fourth sets of signals through the second telescope to the first telescope, wherein the third and fourth sets of signals are not delivered to the second telescope using sub-apertures.

* * * * *

UNITED STATES PATENT AND TRADEMARK OFFICE
CERTIFICATE OF CORRECTION

PATENT NO.        : 10,404,403 B2
APPLICATION NO.   : 15/921478
DATED             : September 3, 2019
INVENTOR(S)       : Troeltzsch et al.

Page 1 of 1

It is certified that error appears in the above-identified patent and that said Letters Patent is hereby corrected as shown below:

In the Claims

In Claim 1, Column 16, Line 61, delete "carder" and insert --carrier-- therefor;

In Claim 1, Column 17, Line 5, delete "interleaves" and insert --interleaver-- therefor;

In Claim 14, Column 18, Line 50, delete "wavengths" and insert --wavelengths-- therefor; and In Claim 14, Column 19, Line 3, replace the "," with a --;--.

Signed and Sealed this
Nineteenth Day of November, 2019

Andrei Iancu
*Director of the United States Patent and Trademark Office*